March 11, 1969

W. E. TEN PAS ET AL 3,432,064

ADJUSTABLE PARTITION FOR COMBINATION GRAIN AND FERTILIZER HOPPER

Filed Dec. 15, 1967

INVENTORS
WARREN E. TEN PAS
ERNST E. SCHNELL
DONALD H. POLZIN

BY

ATTORNEY

United States Patent Office 3,432,064
Patented Mar. 11, 1969

3,432,064
ADJUSTABLE PARTITION FOR COMBINATION GRAIN AND FERTILIZER HOPPER
Warren Edward Ten Pas, Horicon, Ernst Emil Schnell, West Bend, and Donald Herman Polzin, Horicon, Wis., assignors to Deere & Company, Moline, Ill., a corporation of Delaware
Filed Dec. 15, 1967, Ser. No. 690,956
U.S. Cl. 220—22    6 Claims
Int. Cl. B65 5/00, 1/24, 1/36

ABSTRACT OF THE DISCLOSURE

A combination grain and fertilizer hopper for a grain drill provided with an adjustable partition between the fertilizer and grain compartments whereby the volume of one compartment can be increased by diminishing the volume of the other compartment. A rod carried by the adjustable partition is passed through one of a plurality of apertures in a bracket to hold the partition in its desired position of adjustment.

Field of the invention

This invention relates generally to agricultural implements and more particularly to implements such as grain drills and the like having a hopper which normally carries both the seed and fertilizer which is to be distributed.

Description of the prior art

In many of today's grain drills, two hoppers are provided, one hopper being for the grain that is to be distributed, and the other hopper being for fertilizer. In some machines, these two hoppers have been combined into a single hopper with a fixed partition dividing the grain and fertilizer compartments. This form of hopper is known as a combination grain and fertilizer hopper. In this type of machine, during drilling, it is common for one compartment to empty before the other. This is due to the fact that the seed planting or drilling rates and the fertilizer applying rates vary widely and it is uncommon for the seed compartment to empty at the same time as fertilizer compartment. The reasons for the variations in distributing rates are many; however, it should be observed that in a grain drill, both the seed and the fertilizer are distributed on a unit volume basis. One bushel of seed may contain more or less seed than another bushel, and also it may be desirable to plant more less seed per acre depending upon both the nature of the seed and the type of soil. Fertilizers come in various analyses from a low analysis such as 5–5–5 to a high analysis fertilizer such as 16–22–8. Thus, the rate of distribution of the fertilizer may vary according to analysis. Also the requirements for the fertilizer will vary from field to field.

Since one of the fertilizer or grain materials will be completely distributed first, it is necessary to stop the machine to refill the hopper. Obviously, if the hopper could be so designed that the compartments could be so proportioned that both compartments would empty at the same time, it would be possible to drill further between fillings.

The British patent to Sargeant, No. 9,933 of 1900 (issued May 4, 1901), discloses a grain drill having a combination fertilizer and grain hopper in which a partition is provided which is pivoted at its bottom to a center divider. A nut 7 was mounted on a threaded part 5 which passed through a curved slot 6 in the end walls of the hopper and was used to secure the partition in its desired place of adjustment. This design is not commercially acceptable since material can pass over the top of the partition, and also since material can escape through the curved slot 6. Furthermore, there was an insufficient range of adjustment so that the volume could only be varied slightly between the two boxes.

The Drummond Canadian Patent 710,084 discloses a flexible partition for combination grain and fertilizer boxes. It is a particular feature of the Canadian invention that the partition is flexible and inextensible. Thus, the partition can assume only one of two positions. While the Canadian patent overcomes the disadvantage of the earlier British patent in that it provides effective sealing between the compartments, it does not have a sufficient range of adjustments to be commercially acceptable.

Applicants are not aware of any commercial machine having an adjustable partition in a combination grain and fertilizer hopper.

Summary of the invention

It is an object of the present invention to provide an adjustable partition for a combination grain and fertilizer hopper which overcomes the disadvantages of the foregoing prior art.

More particularly it is an object of the present invention to provide an adjustable partition which is secured to the hopper framework at its upper and lower ends, the partition being adjustable in height.

It is a further object of this invention to provide a partition construction which is secured at its upper and lower edges to the framework of a combination grain fertilizer hopper, there being provided means to hold the partition in a plurality of adjusted positions.

Another object of this invention is to provide a hopper construction having an adjustable divider normally disposed between fertilizer and grain sections wherein the divider can be swung to one side where it covers one of the dispensing mechanisms so that substantially the entire capacity of the hopper may be used in conjunction with the other dispenser.

A still further object of this invention is the provision of an adjustable partition for a combination grain and fertilizer hopper in which in one mode of operation the upper and lower portions of the partition are secured to the framework of the hopper, there being means to hold the partition in a plurality of adjusted positions, and in another mode of operation the lower portion of the partition is secured to the framework of the hopper between the fertilizer and grain dispensing means and the upper portion of the partition is secured to the wall of the hopper adjacent the fertilizer dispenser with the partition overlying the fertilizer dispenser whereby substantially the entire capacity of the hopper may be used solely for grain.

These and other objects and advantages of this invention will be apparent to those skilled in the art after a consideration of the following detailed description, taken in conjunction with the accompanying drawings in which the preferred form of this invention is illustrated.

Description of the preferred embodiment

Figure 1:
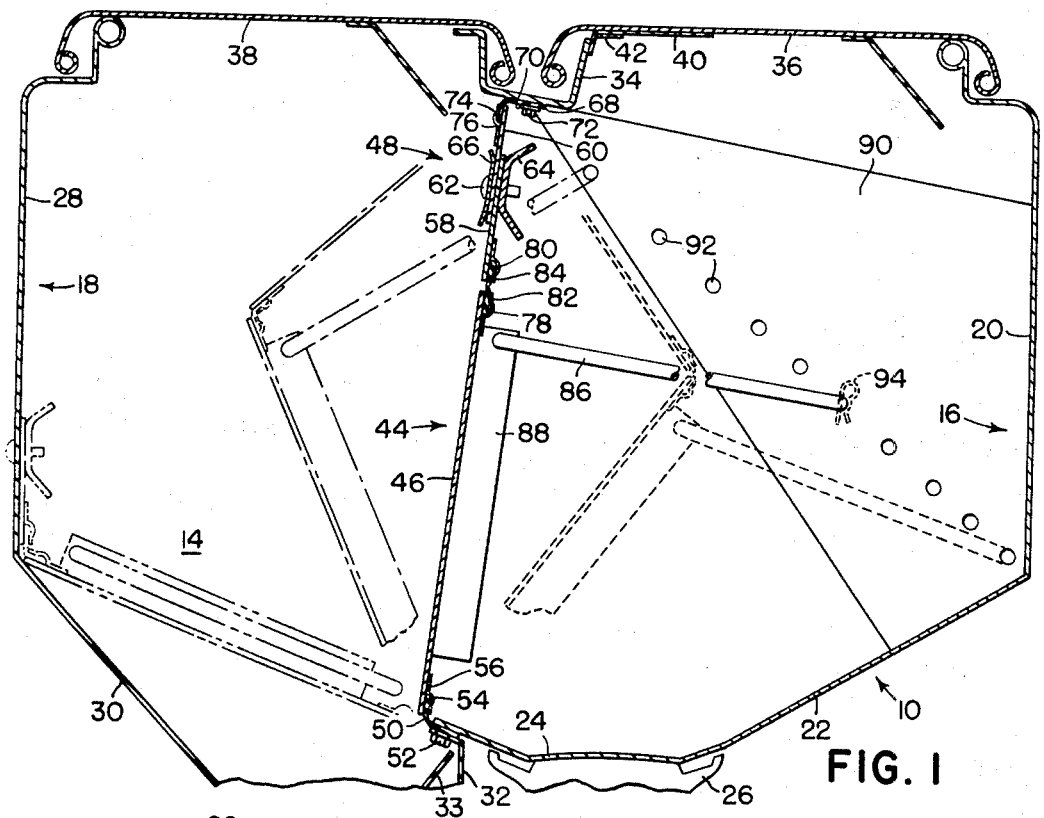
FIG. 1 is a cross section through the combination grain and fertilizer hopper employing the adjustable partition of this invention, the broken lines illustrating the adjustable partition in two extreme positions of adjustment, and one position where the hopper is used solely for grain.
Figure 2:
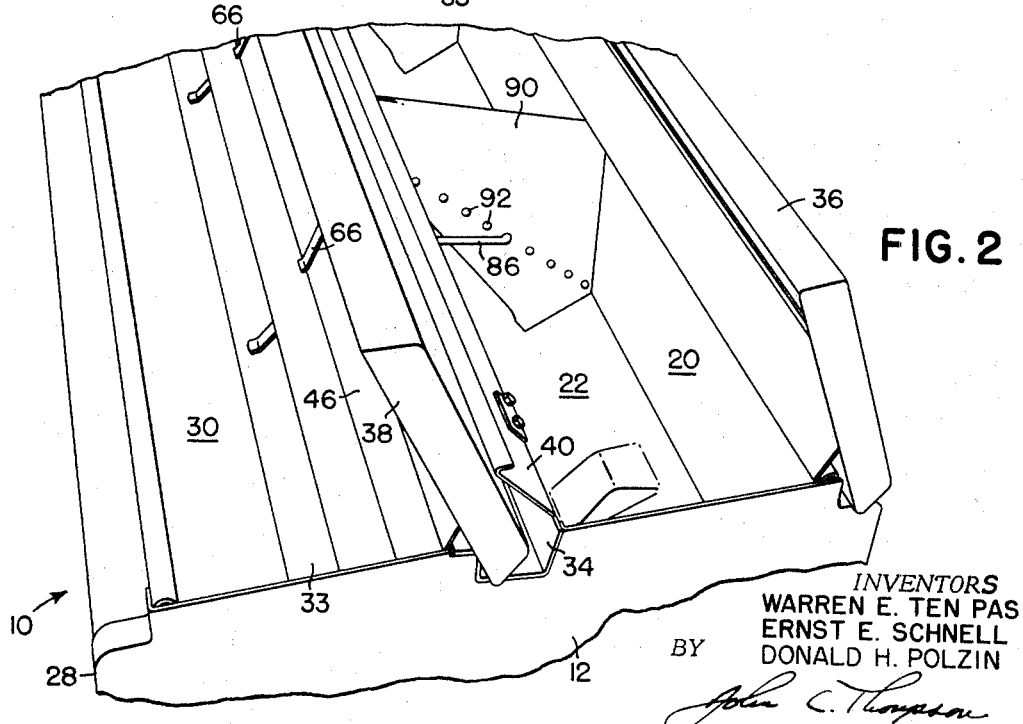
FIG. 2 is a perspective view of the hopper of this invention.

The adjustable partition of this invention is adapted to be associated with a combination grain and fertilizer hopper indicated generally at 10. The hopper is formed from a generally rectangular box having right and left end walls 12 and 14, and front and rear side and bottom walls, indicated generally at 16 and 18. The front side and bottom wall 16 has a vertically extending portion 20, an inclined lower portion 22, and a generally transversely extending apertured bottom portion 24. A plurality of transversely disposed grain dispensing devices 26 are associated with the apertures in the bottom portion 24 and effectively close off the bottom of the forward portion of the hopper.

The rear side and bottom wall 18 is of somewhat similar construction to the front side and bottom wall 16 and has a vertically extending side portion 28, an inclined lower portion 30 and a forward vertically extending lower portion 32. The inclined lower portion and forward vertical portions 30 and 32 are interconnected by a cylindrical bottom section (not shown) in which is disposed a fertilizer dispenser of the type shown in U.S. Patent No. 3,252,629, the fertilizer material being disposed through apertures in the portion 32. A shield 33 is disposed over the fertilizer dispenser. When the fertilizer distributor (not shown) is inactive, the bottom of the rear portion of the hopper is effectively closed off.

A transversely extending channel-shaped member 34 interconnects the right and left end walls 12 and 14 and is disposed approximately halfway between the front and rear side wall portions 20, 28. Front and rear covers 36, 38 are hingedly secured at their forward ends to an upper portion of the front wall 20 and the channel member 34, respectively. A shield member 40 is secured to the forward edge of the channel member 34 by a hinge 42 and swings to the rear to cover the channel member when the top 36 is open to prevent grain from being deposited within the channel member when grain is being placed in the forward compartment.

The hopper 10 is divided into forward and rear compartments by an adjustable divider indicated generally at 44. The divider has a lower panel member 46 and an upper two-part extensible and retractable panel member indicated generally at 48. The lower edge of the panel member 46 is hingedly secured to the upper edge of the forward vertically extending lower portion 32 and the rear edge of the apertured bottom portion 24. To this end, one edge of a transversely extending flexible strip 50 is secured between the members 32 and 24 by fastener means 52. The other edge of the flexible strip is provided with an elongated bead 54 and is held between the lower edge of the panel 46 and a bead receiving member 56 welded to the member or panel 46.

The upper two-part extensible and retractable panel 48 includes a lower section 58 and an upper section 60 which are adjustably interconnected by means of roundheaded bolts 62 and wing nuts 64. Each bolt 62 passes through a vertically extending elongated slot (not shown) and the sections 58, 60 can be adjustably positioned by moving the lower section 58 vertically with respect to the upper member within the limits permitted by the elongated slots in sections 58 and 60. An elongated slot cover 66 is provided, the cover 66 being disposed between the head of the roundheaded bolt 62 and the upper section 60.

The upper section 60 is hingedly secured to the transversely extending channel-shaped member 34 by a flexible strip, one edge 68 being disposed between the bottom of the channel-shaped member 34 and a fastening strip 70, the portion 68 being secured to the member 34 by means of fasteners 72. The other edge of the strip is provided with a bead 74 which is held between the upper edge of the section 60 and a bead receiving element 76. The lower edge of the section 58 is secured to the upper edge of the lower panel 46 by means of a flexible strip having upper and lower beads 78, 80 which is held between the upper end of the panel members 46 and the lower end of the member 58 by bead receiving portions 82, 84. The elements 82, 84 are spot welded or otherwise secured in conventional manner to the members 46, 58.

The partition 44 can be swung from the dash-dot-dash position shown to the left in FIG. 1 through an intermediate portion, shown in full lines, to an extreme right-hand position or forward position shown in the dot-dot lines also in FIG. 1. Rods 86 are provided to hold the partition in its desired position of adjustment. To this end a bracket 88 is welded or otherwise secured to the lower panel member 46 and an inturned end of the rod 86 is rotatably disposed within an aperture in the bracket 88. Brackets 90 interconnect the forward wall 20 and the channel member 34 and are provided with a plurality of apertures 92 through which the other end of the rod 86 may be disposed. This end is provided with an aperture through which a spring retaining pin 94 is disposed to hold the rod within the selected aperture.

To change the position of adjustment of the adjustable panel 44, it is necessary to first remove the spring locking pin from the bracket 90 end of the rod and dispose the rod in an out-of-the-way position. The wing nuts 64 are then loosened and the partition is tapped with the heel of the hand until the desired position is reached. The rods are then inserted in the proper holes and locked with pins 94. Subsequently, the wing nuts 64 are tightened with the slot covers being held over the slots. The ends of the panels 46, 48 carry sealing strips (not shown) which engage end walls 12, 14.

When fertilizer is not to be applied, the movable partition can be folded back with the top portion of the portion 46 being disposed at the junction of inclined lower portion 30 and side portion 28, lower section 58 of the extensible and retractable upper panel member being bolted securely to the rear wall 28. This is shown in the dot-dot-dash lines in FIG. 1.

We claim:
1. In a combination grain and fertilizer hopper for a grain drill or the like, a movable center partition, comprising: a lower panel member hingedly secured at its lower end to a bottom portion of the hopper, a second panel member hingedly secured at its lower end to the upper end of the lower panel member and hingedly secured at its upper end to a transversely extending frame member, one of said panel members being extensible and retractable in height, and means to hold said panel members in various positions of adjustment whereby the volume in a compartment to one side of the partition may be varied inversely with respect to the volume of the compartment to the other side of the partition.

2. In combination with a rectangular box-shaped hopper having a transversely extending member, a movable center partition operable to divide the hopper into two compartments of varying volumes said movable partition comprising: a lower panel member hingedly secured to a bottom center portion of the hopper, a vertically extensible and retractable upper panel member hingedly secured at its upper end to said transversely extending member, means hingedly interconnecting the upper and lower panel members, and brace means interconnecting an intermediate portion of said partition with said hopper to hold the partition in various positions of adjustment.

3. The invention set forth in claim 2 in which said upper panel member includes a lower section having a vertically extending slot, an upper section having a vertically extending slot, and fastener means passing through said slots and operable to hold the upper and lower sections in various positions of adjustment.

4. The invention set forth in claim 3 in which a slot cover is carried by said fastener means and is operable to cover said slot.

5. In a combination grain and fertilizer hopper for a grain drill or the like having front and rear side walls and front and rear material dispensing means, a movable center partition, comprising: a lower panel member hingedly secured at its lower end to a bottom portion of the hopper, a second panel member hingedly secured at its lower end to the upper end of the lower panel member, a portion of the second panel member above the lower end either being interconnectable with a transversely extending frame member disposed between the front and rear side walls and operable when secured to the frame member to divide the hopper into a grain compartment and a fertilizer compartment, or being interconnectible with one of the side walls and operable when secured to said side wall to cover one of the material dispensing means whereby substantially the entire capacity of the hopper may be used for material to be distributed through the other material dispensing means.

6. The invention set forth in claim 5 in which said upper panel member includes upper and lower sections, the upper end of the upper section being secured to said transversely extending frame member, the lower section being either adjustably secured to the upper section, or fixedly secured to said one side wall.

References Cited
UNITED STATES PATENTS

| | | | |
|---|---|---|---|
| 486,919 | 11/1892 | Winget | 220—22 |
| 964,245 | 7/1910 | Hadley | 220—22 |
| 3,172,556 | 3/1965 | Stiefel | 220—22 |

FOREIGN PATENTS 47,549   1/1940   Netherlands.

GEORGE E. LOWRANCE, *Primary Examiner.*